June 23, 1953 H. HERMANNY 2,642,743
INSTRUMENT POINTER ACTUATING MECHANISM AND ADJUSTMENT
Filed March 18, 1947 4 Sheets-Sheet 2
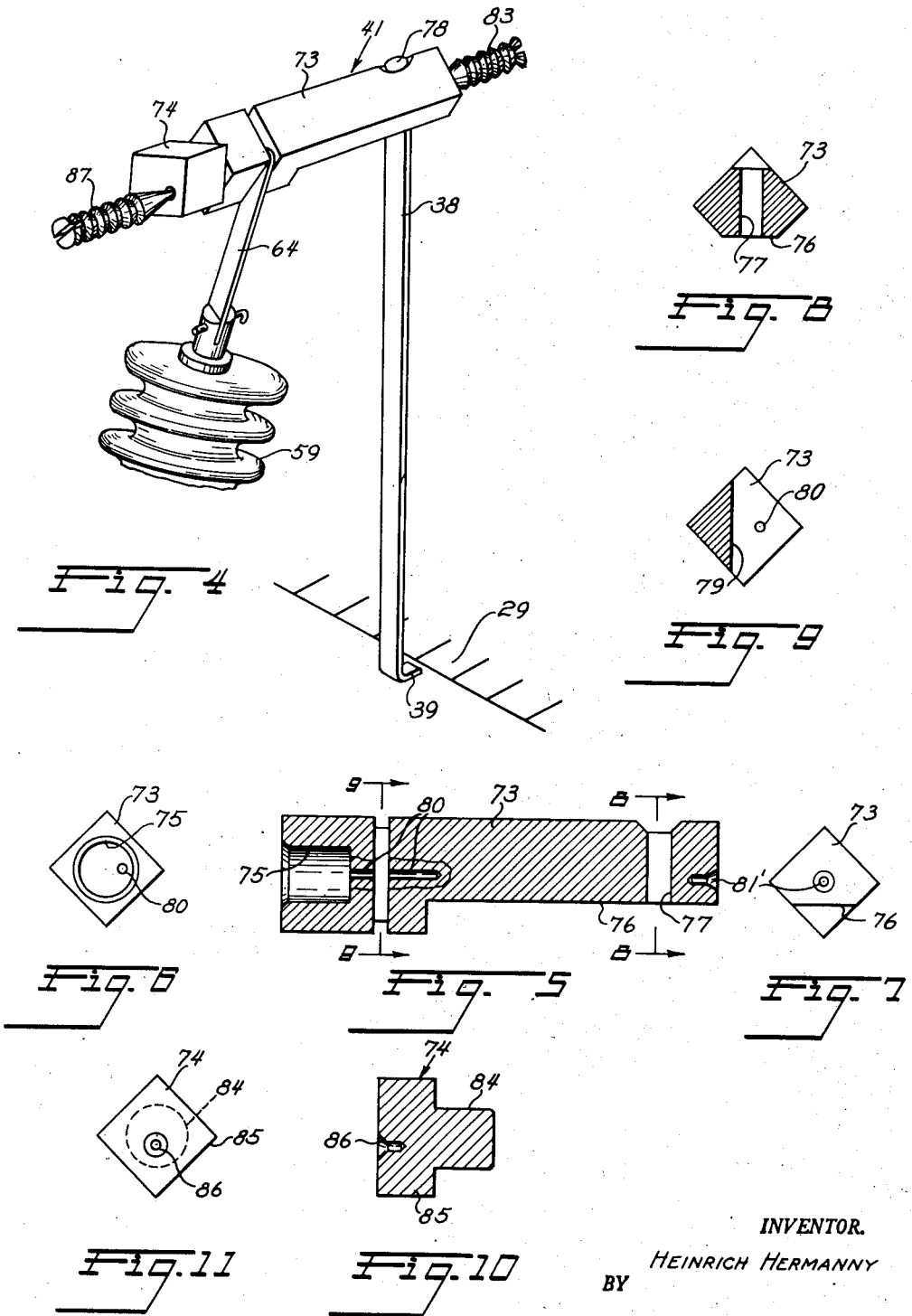
INVENTOR.
HEINRICH HERMANNY
BY James E. Nolan
ATTORNEY June 23, 1953   H. HERMANNY   2,642,743
INSTRUMENT POINTER ACTUATING MECHANISM AND ADJUSTMENT
Filed March 18, 1947   4 Sheets-Sheet 3

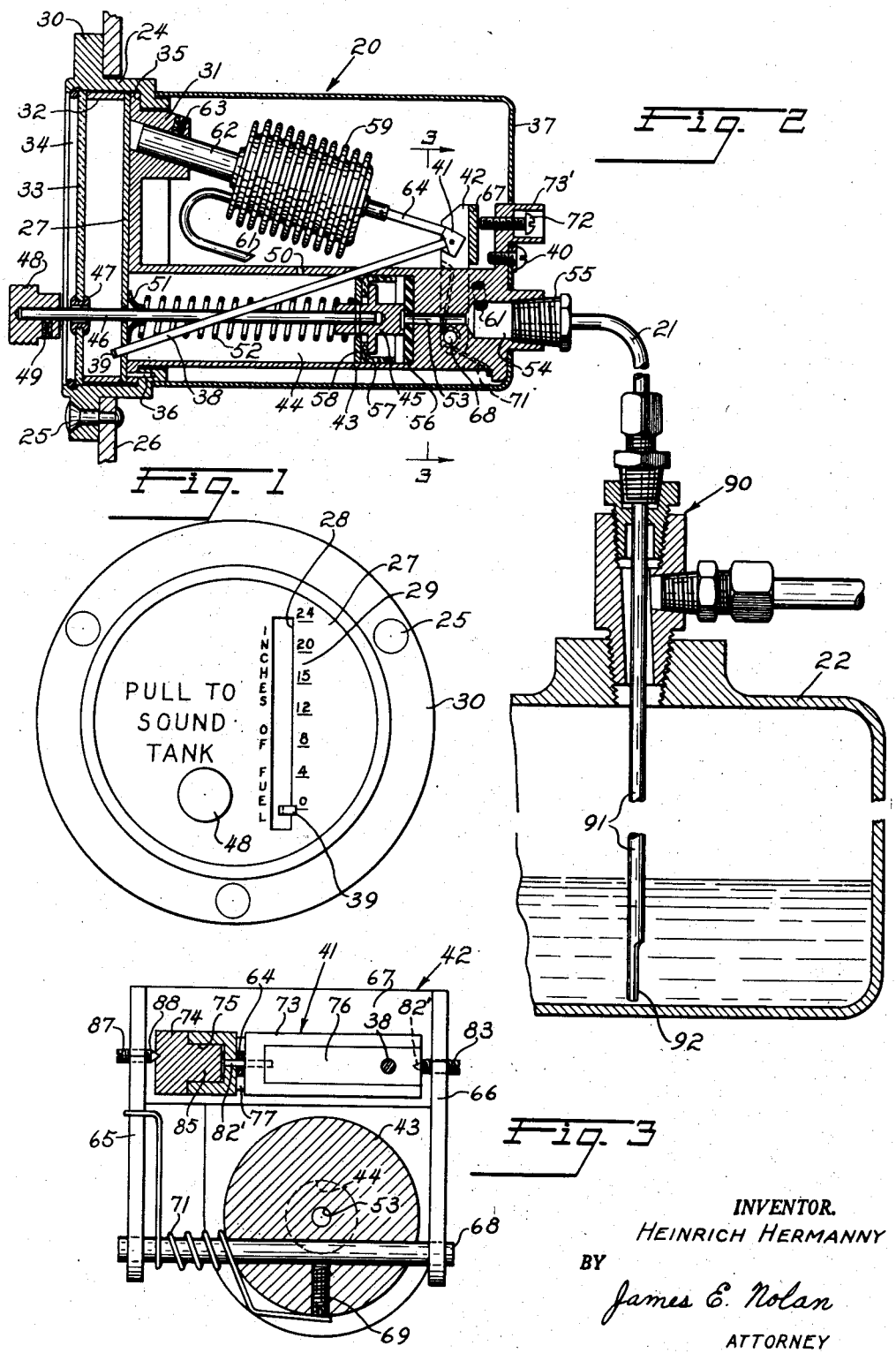

INVENTOR.
HEINRICH HERMANNY
BY
James E. Nolan
ATTORNEY

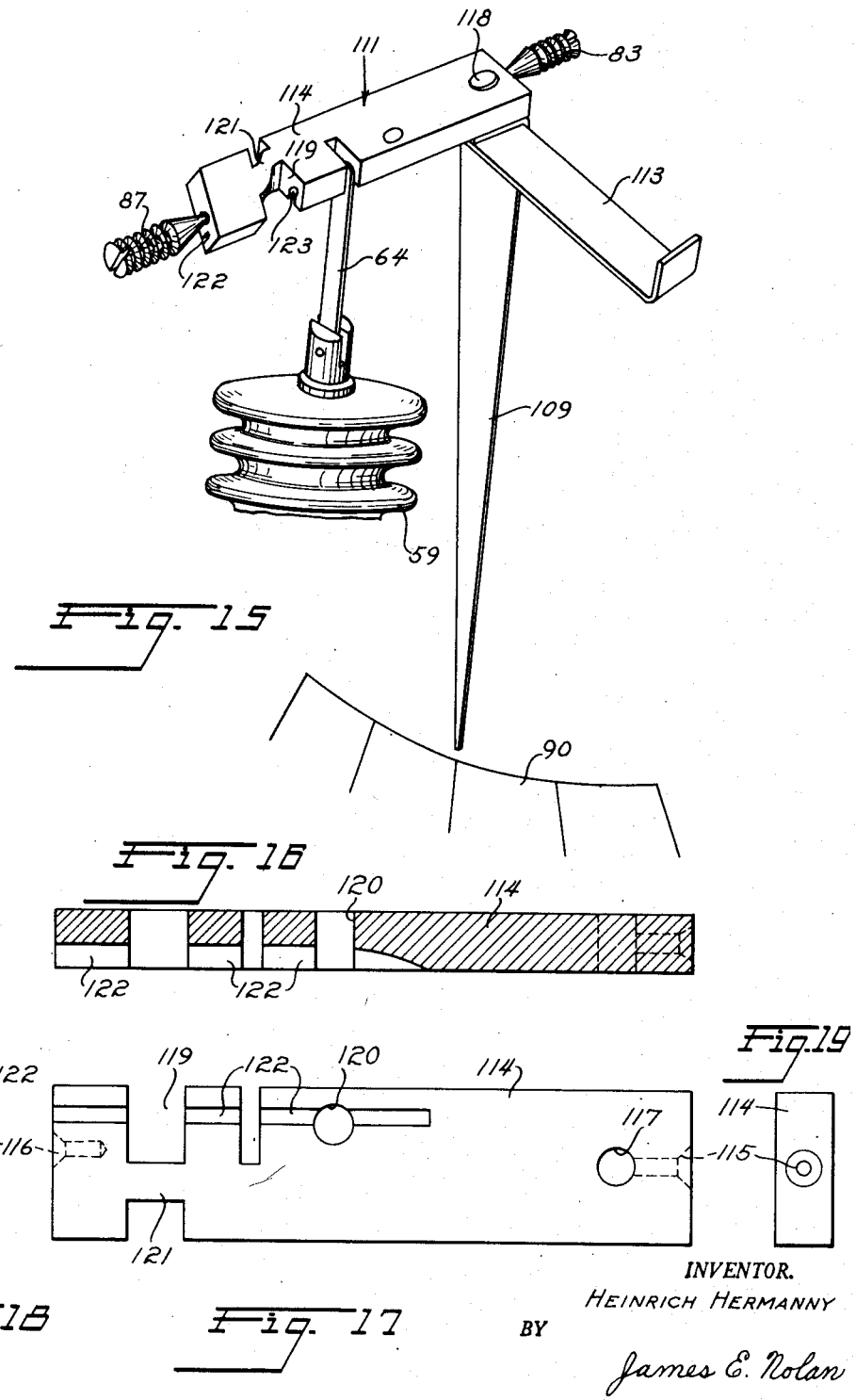

Patented June 23, 1953

2,642,743

UNITED STATES PATENT OFFICE 2,642,743

INSTRUMENT POINTER ACTUATING MECHANISM AND ADJUSTMENT

Heinrich Hermanny, Valley Stream, N. Y.

Application March 18, 1947, Serial No. 735,331

13 Claims. (Cl. 73—410)

This invention relates to instruments, gauges and the like and particularly to pointer actuation linkages and adjustments for such.

The invention will be particularly described in its preferred embodiments as applied to pressure gauges of the hydrostatic type, but it will be understood that the novel subcombination linkages and adjustments are capable of use in other gauges and instruments.

The invention in its preferred embodiment is peculiarly adaptable to measuring the depth of fuel in tanks such as motor boat fuel tanks and home fuel oil tanks. It contains a source of pressure which is manually activated to actuate a pressure responsive element connected to a pointer by a simple low friction linkage containing both zero and rate adjustments that enable the gauge to be speedily calibrated to coact with its associated tank.

While hydrostatic fuel gauges having rate adjustments are known, such gauges which are commercially used within my knowledge are relatively complicated as compared to my construction and the mechanisms of their rate adjustments introduce additional sliding friction losses that are objectionable from the standpoint of accuracy and sensitivity, and my construction avoids this objection.

With the above in mind it is a major object of the invention to provide a novel instrument pointer actuating linkage and adjustment.

A further object of the invention is to provide a gauge construction embodying a pivoted linkage interposed between a pressure sensitive element and a pointer, the linkage containing a novel fulcrum adjustment.

A further object of this invention is to provide a gauge of the above-mentioned character also having a novel zero adjustment.

It is a further object of the invention to provide a novel pointer actuating linkage and adjustment.

A further object of the invention is to provide a novel eccentric adjustment for an instrument pointer.

It is a further object of the invention to provide a novel adjustable rocker mounting for a pointer actuating linkage, providing a zero adjustment.

An object of the invention is also to provide an activating plunger and pointer actuating linkage in novel combination.

Further objects of the invention will presently appear as the description proceeds in connection with the appended claims and the annexed drawings wherein:

Figure 1 is a front elevation of the gauge of Figure 2;

Figure 2 is a section in elevation illustrating a gauge according to a preferred embodiment of the invention connected to the top of a fuel tank;

Figure 3 is a section on line 3—3 of Figure 2 illustrating details of the pointer linkage mounting and the rate adjustment of the pointer;

Figure 4 is a rather diagrammatic pseudo-perspective view illustrating further the pointer linkage and adjustment;

Figure 5 is a side elevation of the eccentric rocker of the adjustment;

Figures 6 and 7 are opposite end views of the rocker of Figure 5;

Figure 12:
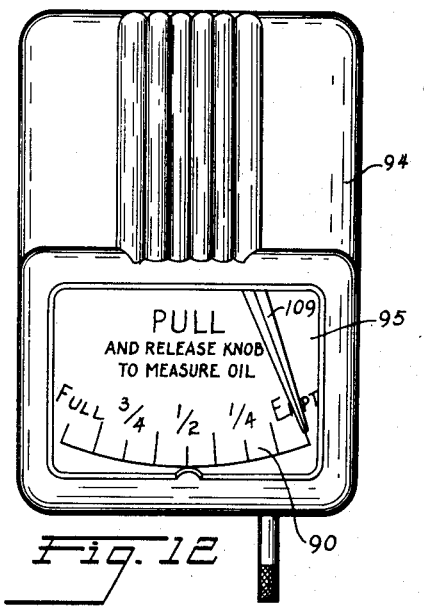
Figure 13:
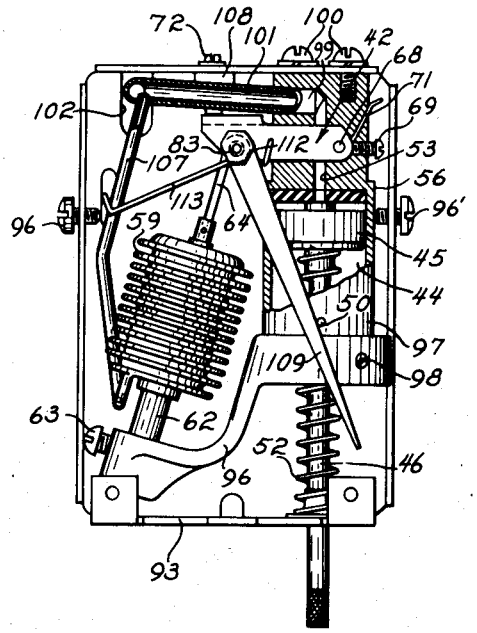
Figure 14:
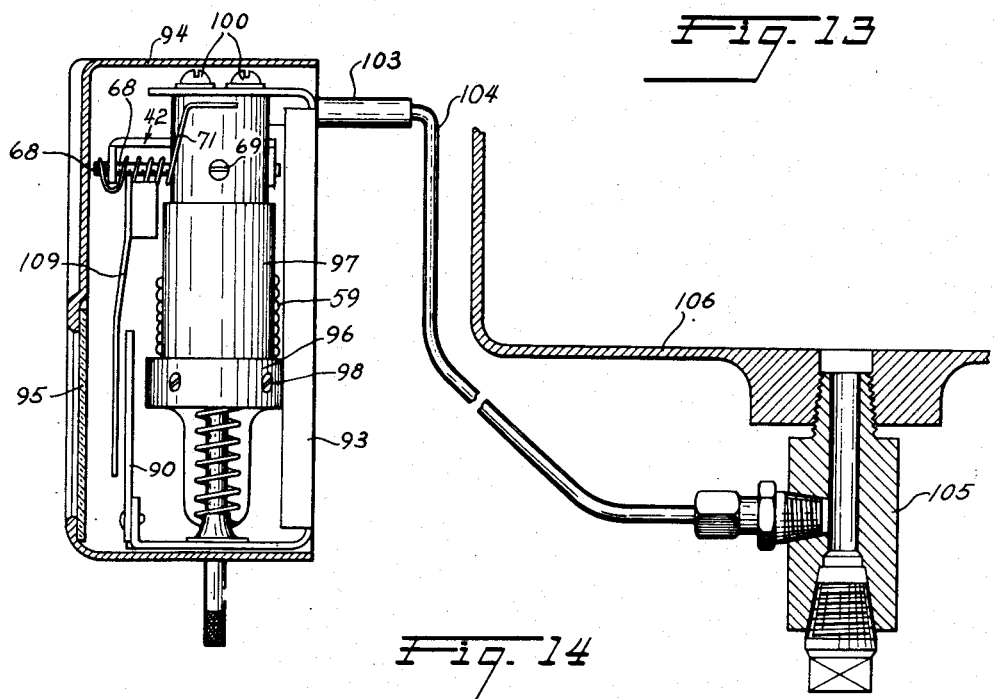

Figure 8 and 9 are sections respectively on lines 8—8 and 9—9 of Figure 5;

Figure 10 is an axial section through the relatively adjustable end support for the rocker;

Figure 11 is an inner end view of the support of Figure 10;

Figure 12 is a front view of a gauge according to a further embodiment of the invention;

Figure 13 is a front elevation with the outer case removed and partly in section through the gauge of Figure 12 illustrating the pointer linkage;

Figure 14 is a side elevation partly in section through the gauge of Figure 12 and showing its connection to the bottom of a fuel tank;

Figure 15 is a diagrammatic pseudo-perspective view of the pointer actuating linkage and rate adjustment of the gauge of Figures 12-14; and Figures 16, 17, 18 and 19 are top, side and opposite end views respectively of the eccentric adjustment rocker of the gauge of Figures 12-15.

In the embodiment of Figures 1-11, a hydrostatic pressure gauge 20 is connected by a conduit 21 to a fuel tank 22 in a motor boat, although the bottom connection of Figure 14 could be employed where space considerations demand. Gauge 20 comprises a rigid front case member 24 having a peripheral flange 30 secured as by rivets 25 in an opening in an instrument panel 26. Case member 24 houses an index dial 27 apertured at 28 and containing a scale 29 here indicating the depth of fuel in tank 22.

Dial 27 is held flat against a rear case member 31 by a spacer collar 32, a transparent glass window 33 and a split ring and groove assembly at 34. Case member 31 is seated at the bottom of internal shoulder 35 in case member 24 so that ring 34 holds case members 24 and 31 tightly together in the assembly, and a pin 36 orients the mechanism on rear case member 31 with respect to the front case member 24. A sheet metal rear cover 37 which has a tight frictional fit with a flange on front case member 24 behind panel 26 houses the mechanism supported by rear case member 31.

Rear case member 31 is an instrument frame that carries the pointer and entire pointer operating and adjustment mechanism. A pointer 38 which has a bent front end 39 projecting through dial slot 28 to coact with scale 29 has it rear end rigidly connected to a rocker assembly 41 pivotally mounted upon the upper end of a cradle 42 that in turn is pivotally mounted on the rear end of a cylinder 43 projecting integrally rearwardly from case member 31. Cover 37 is secured on the rear case member as by a screw 40.

Cylinder 43 contains a chamber 44 open at its front end where it is covered by dial 27 in the assembly. A fluid tight leather cup type piston 45 is reciprocably mounted in chamber 44 manually actuated by a rod 46 that passes through an aperture in dial 27 and a rubber grommet 47 in an aperture in window 33. A knob 48 is secured to rod 46 as by a set screw 49 so that the knob may be removed to disassemble the gauge. A suitable eyelet 51 rigid with dial 27 serves as a piston rod guide and support and also to center a coiled compression spring 52 that reacts in the assembly between the relatively stationary dial 27 and the movable piston 45, so that piston 45 is normally urged to the position of Figure 2. An air admission aperture 50 is provided in the wall of chamber 44 for a purpose to be described.

The integral rear end of cylinder 43 closes chamber 44 except for a small diameter axial bore 53 that places piston chamber 44 in fluid communication with an outlet pressure chamber 54 having its outer end threaded to receive a fitting 55 on the end of conduit 21. The rear wall of piston chamber 44 carries a washer 56 of synthetic rubber or like resilient material apertured in alignment with bore 53 and adapted to be tightly engaged and compressed by the annular crowned rear end of piston 45 to sealingly close communication between chambers 44 and 54 when the piston is spring urged into its position of Figure 2. Piston 45 carries a leather cup 57 secured to it by a washer 58 engaged by the rear end of spring 52 whereby the chamber sections 44 at opposite sides of piston 45 are fluid tight with respect to each other. Piston 45 effects air tight closure of bore 53 in Figure 2.

The interior of a Sylphon or pressure sensitive bellows 59 is subjected to the fluid pressure of outlet chamber 54 by a conduit 61. Sylphon 59 at one end has a support projection 62 adjustably secured in an aperture in rear case member 31 as by set screw 63. The rear end of Sylphon 59 is pivotally connected to a link 64 that in turn is pivotally connected to rocker 41.

Referring now to Figure 3, cradle 42 comprises a pair of upright arms 65 and 66 integrally connected at their upper ends by a flat bridge 67. The lower ends of arms 65 and 66 are journalled at opposite sides of cylinder 43 on a cylindrical transverse shaft 68 which extends through an aperture in the solid rear end of cylinder 43 and is held against rotation or sliding as by set screw 69. If desired the pivots for cradle 42 could be integral or otherwise rigid projections from cylinder 43 or pivot pins extending into apertures in cylinder 43.

Cradle 42 is biased clockwise in Figure 2 by a tension spring 71 coiled about shaft 68 with one end hooked over the front of cradle arm 65 and the opposite end anchored on cylinder 43.

Clockwise movement of cradle 42 is opposed by an adjustable set screw 72 mounted in a recessed boss 73' in an integral extension of cylinder 43 and bearing against bridge 67. When screw 72 is rotated clockwise it moves forwardly to rock cradle 42 counter-clockwise against the tension of spring 71 toward Sylphon 59. As will further appear, during this adjustment the pivot 82' (Figure 3) between link 64 and the rocker assembly 41 serves as a stationary fulcrum about which rocker assembly 41 rotates to thereby move the pointer end 39 upward (Figure 1) on scale 29. Reverse rotation of screw 72 permits clockwise movement of cradle 42 away from Sylphon 59 under the influence of spring 71 to lower pointer end 39 with respect to scale 29.

Screw 72 thus provides a zero adjustment for pointer 38 which is independent of the fulcrum adjustment at rocker assembly 41 to be described below. This zero adjustment is made with the tank empty upon installation, or at any time when Sylphon 59 is relaxed with atmospheric pressure within and without.

Referring to Figures 3-11, rocker assembly 41 is made up of two relatively adjustable and eccentrically mounted parts consisting of a rocker bar 73 (Figures 5-9) and a support block 74 (Figures 10 and 11). Rocker bar 73 is primarily of of square cross section as illustrated in Figures 6 and 7 with a short central cylindrical axial bore 75 at one end and a recessed flat shoulder 76 extending to its other end. The plane of shoulder 76 is parallel to the axis of bore 75 and the horizontal diagonal across the bar as illustrated in Figures 7 and 8.

The rear end of pointer 38 is rounded to extend snugly through a hole 77 drilled normal to shoulder 76 and is staked over at 78 (Figure 4) to secure it rigidly to rocker bar 73.

Beyond the bottom of bore 75, rocker bar 73 is formed with a deep transverse notch bottoming in a flat face 79. A small hole 80 is drilled through the bottom of bore 75 parallel and eccentric to the axis of bore 75 so that a small diameter pivot pin 82' (Figure 3) for the rear end of link 64 may be inserted through bore 75 and fitted into hole 80 below the bottom of bore 75. The width and depth of the notch at 79 provide for free pivotal movement of link 64. The eccentricity of bore 75 and pin 82' determines the adjustment range.

Opposite bore 75, rocker bore 73 is formed with a recess having a conical bearing surface 81' coaxial with bore 75. Surface 81' is adapted to seat on the conical tip 82 of a screw pivot 83 (Figure 3) mounted on the upper end of cradle wall 66.

The other end of rocker bar 73 has bore 75 telescoped upon a cylindrical boss 84 projecting from non-circular block 85. The other end of block 85 is formed with a conical bearing surface 86 having its axis parallel to the axis of boss 84 but eccentric with respect to it. A screw pivot 87 axially aligned with screw pivot 83 and having a conical tip 88 fitting with surface 86 supports that end of the rocker assembly. Bearing surfaces 81' and 86 are of slightly greater angle than the corresponding conical ends of pivots 83 and 87 for a purpose to appear.

The fit of boss 84 in bore 75 is a snug friction fit such that the rocker assembly of bar 73 and support 74 normally rotates as a unit about axially aligned pivots 83 and 87 under influence of Sylphon 59.

In the instrument, rocker assembly 41 is supported at opposite ends by axially aligned pivots 83 and 87, but the longitudinal axis of the rocker 41, and with it the axis of pin 82', is usually at a slight angle to the aligned pivot axes due to the eccentricity of boss 84. The axis of rotation of rocker 41, which is the aligned pivot axis, changes position with respect to the axis of pivot 82' during the adjustment effected by relatively rotating bar 73 and block 74 thus changing the moment arm of the actuating force. The fact that the conical bearing surfaces in the rocker ends are of greater angle than the corresponding pivot ends permits this inclination of the rocker axis without binding. The rocker and pointer assembly is therefore essentially an adjustable arm bell crank wherein relative rotation of bar 73 and block 74 serves to change the distance between the actual pivot axis of the rocker assembly and the axis of pivot pin 82'. It will be seen therefore that by holding rocker bar 73 stationary and relatively rotating block 74, as with wrenches and as permitted by the friction fit of boss 84 and recess 75, the fulcrum axis of the rocker assembly 41 may be shifted and the effective leverage distance between pivot 82' and the fulcrum axis of the rocker assembly may be changed, thereby changing the amount that the pointer 38 is moved during a given longitudinal displacement of link 64. The variation of the motion magnification of the linkage is an adjustment of the rate of pointer deflection which enables the gauge to be adapted to accurately coact with an associated fuel tank.

As illustrated in Figure 2, the tank end of conduit 21 is coupled by a suitable fitting 90 with a vertical tube 91 that is open at 92 near the bottom of the tank, so as to provide fluid communication between chamber 54 and opening 92.

*Operation*

Presuming that tank 22 contains a quantity of liquid fuel, a measurement is made of the amount of that fuel in terms of its depth in the tank in the following manner. Knob 48 is pulled outwardly to the fullest extent. During this, internal spring 52 is compressed and air is forced into the chamber 44 through aperture 50. When knob 48 is released, spring 52 expands to drive piston 45 toward the position of Figure 2. After piston 45 in its movement to the right in Figure 2 has passed aperture 50, the entrapped air in front of it in chamber 44 is compressed and compressed air passes through bore 53 into outlet chamber 54 from whence it branches into conduits 61 and 21.

Initially the high air pressure delivered to Sylphon 59 through conduit 61 quickly expands the Sylphon to its maximum extent and thereby rocks the rocker assembly to such extent that pointer 38 momentarily swings up to the full position with respect to scale 29. However, since the lower end of tube 91 opens into the liquid of tank 22, the head of the liquid in the tank determines the air pressure that can be confined in the otherwise closed air pressure system of tube 91, conduit 21, chamber 54, conduit 61 and Sylphon 59. Bore 53 is sealed tight by piston 45 at this time. Air will therefore escape through opening 92 and pass in bubbles upwardly through the tank liquid until the air pressure in that system is balanced by the head of liquid. As air escapes through opening 92, as when the tank is only partially filled, pointer 38 will drop by its own weight until when the liquid head is balanced and the pressure becomes constant the pointer becomes stationary and the reading on scale 29 is an indication of the depth of the fuel in tank 22.

The above operation is accomplished in less than a minute and it provides a temporarily accurate measurement of the depth of liquid in the tank. It remains accurate for several minutes after which the air usually leaks from the pressurized system and allows pointer 38 to eventually drop to zero, the weight of the pointer being its restoring force in the arrangement of the invention.

The zero adjustment is made during installation and is simple enough to permit installation by the boat owner himself, or the home owner in the case of the fuel oil tank of Figure 14. It is accomplished by rotation of screw 72 to change the position of cradle 42. This does not change the rate of pointer deflection.

The zero adjustment is particularly useful in adapting the gauge to top or bottom connection to the tank. It is ordinarily desirable in boats to provide the bottom connection of Figure 14, and the gauge is usually so adjusted when sold to the user. However, should the bottom connection be undesirable, he may provide the top connection of Figure 2, in which case he will find after the connections are made that he must change the gauge zero setting due to the difference in the static heads of liquid effective in the tanks of Figure 2 and Figure 14, the liquid head being greater in the bottom connection of Figure 14. This adjustment is also used to locate pointer 38 at zero when panel 26 is inclined from the vertical.

It is usual to make a second check on the zero setting after all connections are made. To do this, partially fill the tank with fuel, measure the liquid depth with a stick, operate the knob 48 to obtain a scale reading and compare the reading with the stick measurement. If they do not agree, rotate screw 72 until the reading of scale 29 corresponds with the stick reading. The gauge is now accurately installed and ready for use at any time. The relatively delicate pointer rate deflection adjustment is made at the factory and since a gauge is available for each type of tank and the tanks of each type are of uniform dimensions, this adjustment usually need not be disturbed. It can be checked by making a series of readings on the gauge with different amounts of fuel in the tank.

If the boat contains more than one tank, each tank may be selectively connected to the gauge by a suitable two way valve in conduit 21.

The gauge illustrated in Figures 12–19 is particularly adapted to home type fuel oil tank installation, and is mounted on a vertical wall at eye level so as to be available to the user. Similar parts are indicated by the same numbers as in Figure 1–11.

This gauge comprises an instrument frame 93 over which is mounted a cover 94 having a dial viewing aperture containing a transparent window 95. Cover 94 is not shown in Figure 13 but screws 96' for attaching it to the frame are illustrated. A scale dial 90 is secured to an upright tab on frame 93 behind window 95.

Sylphon support 62 is secured as by set screw 63 in a bracket 96 rigid with the instrument frame and cylinder 97. Screws 98 attach bracket 96 to cylinder 97, and cylinder 97 is attached to frame 93 as by screws 100. The interior of cylinder 97 is the same as that of cylinder 43. At the rear of cylinder 97, however, bore 53 opens into a transverse chamber 99 in which is soldered one end of a tube 101 that is bent rearwardly to pass through slot 102 in frame 93 and provide a terminal 103 for attachment of a conduit 104 leading to a fitting 105 at the bottom of a fuel oil tank 106. A conduit 107 connects tube 101 to the interior of Sylphon 59.

Cradle 42 is pivotally mounted on shaft 68 as in the previously described embodiment, and set screw 72 threaded in a frame lug 108 at the top of the gauge bears against the bridge of cradle 42 to provide the zero adjustment of the gauge.

A pointer 109 coacting with scale 90 is secured to a rocker assembly 111 (Figure 15) and pivotally supported at opposite ends on cradle 42 in pivot screws 83 and 87 as in the other embodiment. The axes of screws 83 and 87 are parallel and aligned. Locknuts 112 are provided on the pivot screws. A counter-weight 113 is secured to pointer and rocker assembly to tend to urge the pointer toward the "empty" indication of scale 90.

Referring to Figures 15–19, rocker assembly 111 preferably comprises a rectangular bar 114 of brass or some other malleable metal which retains a given shape. Bar 114 is formed at opposite ends with conical bearing surfaces 115 and 116 that have parallel axes displaced 0.02 inch, one being on the central axis of bar 114, for mounting the bar on pivots 83 and 87.

As illustrated in Figure 17, bar 114 is apertured at 117 to accommodate a rivet 118 for securing together the upper end of pointer 109, a counter-weight 113 and bar 114. Bar 114 is notched at 119 to provide a weakened portion 121 eccentric to the aligned axes of bearings 115 and 116 and which may be twisted to enable the opposite ends of the bar 114 to be relatively rotated for shifting the fulcrum axis of pointer 109 relative to pivot 123 to change the distance therebetween and accomplish a rate adjustment similar to that of Figures 1–11.

A slot 122 is milled into one side of bar 114, and a wire pin 123 is inserted and crimped into the slot to provide a pivot connection for the end of link 64 as illustrated in Figure 15. The end of pin 123 is bent over into aperture 120 to prevent accidental removal during operation.

In operation the gauge of Figures 12–19 is the same as that of Figures 1–11, except that counterweight 113 serves to restore the pointer to zero. The zero adjustment for bottom connected tanks is checked as above. The pointer rate of deflection adjustment is made by holding the long portion of bar 114 stationary with a wrench and applying a second wrench to the short eccentrically mounted portion and turning it, thereby twisting and deforming weakened portion 121 and shifting the actual fulcrum axis of rocker assembly 111 with respect to the axis link pivot 123 to change the degree of rocking of assembly 111 for a given stroke of link 64.

I have provided a simple and useful pressure gauge for measuring the amount of liquid in tanks or the like. In these gauges above described, I may obtain motion magnifications between the Sylphon and pointer end of up to 100 to 1, utilizing only a single lever and no multiplication gears. This gives excellent accuracy with a minimum of friction. The two basic adjustments are novel subcombinations of use in any apparatus and are separate and independent. The pointer deflection rate adjustment changes the fulcrum axis of the rocker assembly lever, and the zero adjustment shifts the entire linkage with respect to the bellows and scale without disturbing the deflection adjustment. The gauge may be installed with ease and accuracy by any purchaser, and it is usually necessary to make only the simple zero adjustment on installation.

The rocker construction and adjustments and other features of the above two embodiments may be interchanged at will without departing from the spirit of the invention. The adjustment of Figure 15 is less expensive, but the adjustment of Figure 4 is more accurate and preferable for more expensive gauges.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an instrument, a pointer connected rocker member pivotally supported at opposite ends for rocking on a longitudinal axis, said rocker member comprising two end sections connected by an intermediate section, and an actuator link pivotally connected to one of said end sections on an axis adjacent and slightly inclined with respect to the pivot axis of said rocker member, said intermediate section being torsionally adjustable to change the distance between said axes.

2. In an instrument, a pointer carrying rocker member pivotally supported at opposite ends on a fixed axis, said rocker member comprising longitudinally spaced separate members, a condition responsive element pivotally connected to one of said members on an axis spaced from said pivot axis, and means interconnecting said members adjustable to effect relative transverse displacement of said members for altering the distance between the axis of rotation of said rocker member and the axis of said connection between said element and said one member.

3. In an instrument, a rocker member pivotally supported on opposed pivots, a condition responsive element pivoted to the rocker member on an axis spaced from the pivot axis of said rocker, said rocker member comprising longitudinally spaced sections having a rotatable eccentric connection between them adjustable to permit relative transverse displacement of said spaced sections to alter the distance between said axes.

4. In an instrument, a pointer carrying rocker member pivotally supported at opposite ends, said rocker member comprising longitudinally spaced sections interconnected by a section that is torsionally adjustable to effect relative transverse displacement of said spaced sections, and a movable condition responsive element pivoted to said rocker member on a longitudinal axis that is spaced from the axis of rotation of said rocker, said torsional adjustment of the rocker member changing the distance between said axis of rotation of the rocker member and said longitudinal axis to vary the action of said element upon said pointer.

5. In an instrument, an integral rocker bar made of a metal that retains a given shape, said bar comprising end sections connected by a twistable intermediate section, aligned fixed pivot elements in said instrument, substantially parallel but slightly transversely displaced sockets in the respective ends of said bar for freely rockably mounting said bar on said pivot elements in said instrument, an actuating member pivotally connected to one end section of said bar on an axis that is substantially longitudinal but transversely spaced from the pivot axis of said bar, said spacing determining the effective leverage on said bar, and a pointer rigid with said one end section of said bar, the distance between said longitudinal axis and the axis of rocking of said bar being varied when said end sections are relatively twisted as permitted by said intermediate section to vary the displacement of said pointer for a given movement of said actuating member.

6. In the instrument defined in claim 5, said pivot elements being conical headed and said sockets being conical but of a greater apex angle than said elements to permit free tilt of the rocker axis with said adjustment.

7. In an instrument, a pointer carrying rocker member pivotally supported at opposite ends for rocking about a fixed axis, said rocker member comprising longitudinally spaced sections, a condition responsive element pivotally connected to one of said sections upon an axis that is laterally spaced from said pivot axis, and means interconnecting said sections torsionally adjustable to effect relative transverse displacement of said sections for altering the distance between the said axes and thereby varying the amount of movement of the pointer in response to a given movement of said condition responsive element.

8. In the instrument defined in claim 7, a movable member on which said rocker is pivoted, and means for adjusting said member to displace said rocker in a direction toward or away from said condition responsive element for effecting zero adjustment of said pointer.

9. In an instrument, a rocker bar made of a material that holds a given shape after deformation pivotally supported at opposite ends, a pointer having one end rigid with said bar, means for connecting a movable condition responsive element to said bar for rocking it about its pivots, and a weakened readily deformable region in said bar intermediate said pivoted ends.

10. In an instrument, a rocker bar comprising two longitudinally disposed members each mounted at its outer end on a stationary pivot member, and said pivot members having parallel axes, a cylindrical bore in the inner end of one of said members, and a cylindrical boss projecting from the other of said members into snug frictional engagement in said bore, the axis of said bore being substantially concentric with the longitudinal axis of the member in which it is formed and the axis of said boss being eccentric with respect to the longitudinal axis of the member carrying it.

11. In an instrument, axially aligned pivot means, and a rocker extending between said pivot means with eccentrically connected end sections each mounted on one of said pivot means, means for rotating said rocker comprising a member pivoted to said rocker upon a longitudinal axis spaced from the axis of said pivot means, said end sections being relatively rotatable at said eccentric connection for changing the inclination of said rocker with respect to said pivot axis and thereby changing the distance between said axis of rotation of the rocker and said longitudinal axis to vary the degree of rotation of said rocker for a given stroke of said member.

12. In the instrument defined in claim 11, said aligned pivot means having conical surfaces and said rocker having coacting conical bearing surfaces at opposite ends journalled on said pivot surfaces, said pivot surfaces permitting such angularity of the rocker with respect to the aligned axis of the pivot means as may be necessitated by the adjustment.

13. In an instrument, axially aligned pivot means, and a rocker extending between said pivot means with eccentrically connected end sections each mounted on one of said pivot means, means for rotating said rocker comprising a member pivoted to said rocker upon a longitudinal axis spaced from the axis of said pivot means, said end sections being relatively displaceable at said eccentric connection for changing the inclination of said rocker with respect to the pivot axis and thereby changing the distance between said axis of rotation of the rocker and said longitudinal axis to vary the degree of rotation of said rocker for a given stroke of said member.

HEINRICH HERMANNY.

References Cited in the file of this patent

UNITED STATES PATENTS

| Number | Name | Date |
|---|---|---|
| 1,064,555 | Simmance et al. | June 10, 1913 |
| 1,978,665 | Beecher | Oct. 30, 1934 |
| 2,064,198 | Durant | Dec. 15, 1936 |
| 2,184,163 | Barnes | Dec. 19, 1939 |

FOREIGN PATENTS

| Number | Country | Date |
|---|---|---|
| 275,336 | Great Britain | Aug. 5, 1927 |
| 322,258 | Great Britain | Dec. 5, 1929 |